United States Patent
Chiueh et al.

(10) Patent No.: US 9,503,996 B2
(45) Date of Patent: Nov. 22, 2016

(54) METHOD AND APPARATUS FOR CELL SEARCH AND SYNCHRONIZATION IN MOBILE COMMUNICATION

(71) Applicant: National Taiwan University, Taipei (TW)

(72) Inventors: Tzi-Dar Chiueh, Taipei (TW); Chun-Yuan Chu, Taipei (TW); Yi-Yao Lan, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 123 days.

(21) Appl. No.: 14/444,523

(22) Filed: Jul. 28, 2014

(65) Prior Publication Data

US 2015/0208369 A1   Jul. 23, 2015

(30) Foreign Application Priority Data

Jan. 17, 2014   (TW) .............................. 103101760 A

(51) Int. Cl.
| | |
|---|---|
| *H04J 3/06* | (2006.01) |
| *H04L 12/28* | (2006.01) |
| *H04W 56/00* | (2009.01) |
| *H04J 11/00* | (2006.01) |
| *H04L 27/26* | (2006.01) |

(52) U.S. Cl.
CPC ........ *H04W 56/001* (2013.01); *H04J 11/0073* (2013.01); *H04L 27/2659* (2013.01); *H04W 56/0015* (2013.01); *H04W 56/0035* (2013.01)

(58) Field of Classification Search
CPC ............................. H04L 27/26; H04L 27/28

USPC .................................. 370/324, 503; 455/502
See application file for complete search history.

(56) References Cited

U.S. PATENT DOCUMENTS

| | | | | |
|---|---|---|---|---|
| 7,515,657 | B1 * | 4/2009 | Lee ..................... | H04L 27/2657 375/316 |
| 7,756,003 | B1 * | 7/2010 | Lee ......................... | H04B 7/01 370/208 |
| 7,929,937 | B2 * | 4/2011 | Koivunen ........... | H04L 27/0014 370/208 |
| 8,804,691 | B1 * | 8/2014 | Zhao ................... | H04L 27/2659 370/350 |
| 2008/0232513 | A1 * | 9/2008 | Wang .................. | H04L 27/2675 375/340 |
| 2008/0260085 | A1 * | 10/2008 | Lin ..................... | H04L 27/2659 375/362 |
| 2009/0147873 | A1 * | 6/2009 | Li ....................... | H04L 27/2659 375/260 |
| 2009/0154627 | A1 * | 6/2009 | Park .................... | H04L 27/2659 375/365 |

FOREIGN PATENT DOCUMENTS

WO    WO 2012027880 A1 *   3/2012   ......... H04L 27/2659

* cited by examiner

*Primary Examiner* — Khaled Kassim
*Assistant Examiner* — Berhanu Belete
(74) *Attorney, Agent, or Firm* — Bacon & Thomas, PLLC

(57) ABSTRACT

The present invention provides a method and an apparatus for cell search and synchronization for subscriber stations of the Long Term Evolution (LTE) system. The invention uses primary synchronizing signal of primary synchronization code in each frame structure to establish synchronization with the base station when a subscriber station accesses the LTE network. With such synchronization between the subscriber station and the base station, control signals and transmission data may be correctly exchanged between them.

12 Claims, 8 Drawing Sheets

METHOD AND APPARATUS FOR CELL SEARCH AND SYNCHRONIZATION IN MOBILE COMMUNICATION

BACKGROUND OF THE INVENTION

1. Field of the Invention

The present invention relates to wireless communication, and more particularly, to a method and an apparatus for cell search and synchronization for a subscriber station of the Long Term Evolution (LTE) system. In the LTE system, a base station will transmit a specific primary synchronization signal in each frame to allow a subscriber station to detect the cell arrangement in the LTE system, thereby establishing system synchronization. The method proposed by the present invention can accurately and effectively detect various primary synchronization signals used by different base stations and simultaneously complete system synchronization and the detection of the integer carrier frequency offset (ICFO).

2. Description of the Prior Art

Currently, various communication standards, such as E-UTRA (the abbreviation for evolved UMTS Terrestrial Radio Access), also referred to as Long Term Evolution (LTE), have been developed to provide relatively high data rate so as to support high quality services. LTE is a 3rd Generation Partnership Project (3GPP) standard that provides for an uplink speed of up to 50 Mbps and a downlink speed of up to 100 Mbps. The LTE/E-UTRA standard represents a major advance in cellular technology. The LTE/E-UTRA standard is designed to meet current and future carrier needs for high-speed data and media transport as well as high-definition video support. The LTE/E-UTRA standard brings many technical benefits to cellular networks, some of which include the benefits provided by Orthogonal Frequency Division Multiplexing (OFDM) and Multiple Input Multiple Output (MIMO) data transmission.

An OFDM system is characterized by high spectrum efficiency, frequency selective fading resistance, multipath fading resistance, inter-symbol interference (ISI) resistance and adaptive transmission mechanism, and is capable of using a simple frequency domain equalizer (FDE) as data recovery of a receiver. In addition, in the LTE system, Orthogonal Frequency Division Multiple Access (OFDMA) and Single Carrier-Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the transmission of synchronization signals and cell search procedures provide a basis for the mobile device or UE to detect and synchronize with individual cells. To communicate with a particular cell, mobile devices in associated LTE/E-UTRA coverage area need to determine one or more cell specific transmission parameters such as symbol timing, radio frame timing, and/or a cell identification (ID). In the LTE/E-UTRA standard, the cell-specific information is carried by reference and synchronization signals. The latter forms the basis for DL synchronization and cell specific information identification at the mobile devices within the associated LTE/E-UTRA coverage area. Two DL synchronization signals, namely Primary Synchronization Signal (PSS) and Secondary Synchronization Signal (SSS), are used to allow the mobile devices to synchronize with the transmission of the particular cell, thereby obtaining cell specific information.

The traditional synchronization technique for the LTE system detects the primary synchronization signal based on a joint detection of the unique identification to which the primary synchronization signal corresponds and the ICFO. Traditional methods are complicated and require a huge amount of hardware resource. Moreover, the robustness of traditional detection techniques in resisting frequency selective fading caused by the wireless channel is poor, thus the accuracy of the detection and the communication quality are compromised. Therefore, the above-mentioned traditional methods still have many defects and need to be improved.

In view of the above-mentioned defects in traditional methods, the inventor endeavors to develop a method and an apparatus for cell search and synchronization for a subscriber station of the LTE system.

SUMMARY OF THE INVENTION

In view of the above-mentioned problems in the prior art, an object of the present invention is to provide a method and an apparatus for cell search and synchronization for a subscriber station of the LTE system, in which the subscriber station detects the specific primary synchronization signal transmitted by the base station within each fame to obtain correct clock pulses of the LTE system when intending to access the LTE system, thereby the sequential transmission of control signals and data between the base station and the subscriber station can be performed smoothly.

Another object of the present invention is to provide a method and an apparatus for detecting the ICFO even under the circumstance that the unique identification used by the primary synchronization signal is undetermined. The method and apparatus employs the central symmetry property of all primary synchronization signals to estimate the ICFO without the exact ID of the current primary synchronization signal. Then, the method and apparatus determines the unique ID of the primary synchronization signal based on the estimated ICFO, thereby forming a sequential detection. The sequential detection can overcome the defect of high complexity of traditional methods that employ a joint detection to simultaneously detect the unique cell ID and the ICFO, effectively reduce the hardware resource consumption, and improve the communication quality of the LTE system.

Another object of the present invention is to provide a normalization procedure that enables the detection method of the present invention to effectively eliminate the negative impact of frequency selective fading, improve the detection accuracy and enhance the communication quality of the LTE system.

The method and apparatus for cell search and synchronization for a subscriber station of the LTE system aim to detect a primary synchronization signal transmitted by a base station. According to the LTE standard, there are three different primary synchronization signals defined in the LTE system. Therefore, the subscriber station needs to detect the primary synchronization signal used in the cell and the sector region where it is currently located to carry out subsequent data communications. According to the present invention, the symbol boundary detection is performed when the subscriber station first receives the base station signals. After the symbol boundary is determined, the location of each symbol can be obtained with the guard intervals (GI) between symbols in the OFDM system removed. After the Fast Fourier Transform (FFT) is performed, the detection of the ICFO and the identification of the primary synchronization signals can be made. According to the present invention, the ID of the primary synchronization signal is determined based on the correlation between the received signal and different primary synchronization signals. The signal with the greatest correlation will be elected as the primary synchronization signal used in the region where the subscriber station is located.

The method and apparatus for cell search and synchronization for a subscriber station of the LTE system of the present invention comprises six units, including: (1) an analog to digital conversion (ADC) unit, (2) an energy detector, (3) a symbol boundary detector, (4) an FFT unit, (5) an ICFO detector and (6) a primary synchronization signal detector. The ADC unit is utilized to convert analog signals to digital signals to realize signal processing in digital format. Next, the energy detector detects the energy of the received signals accumulated for a period of time, and such information will serve as normalization reference value for the subsequent unit. In the symbol boundary detector, the Cyclic Prefix (CP) of an OFDM symbol is utilized to detect the symbol boundary. Next, the FFT unit is utilized to transform the synchronization signal from time domain to frequency domain. The frequency domain signal is sent to the ICFO detector. According to the present invention, this unit employs the central symmetry property of the primary synchronization signal sequence to obtain the estimated ICFO and then compensate the ICFO effect. After the frequency domain signal is compensated, the primary synchronization signal detector detects which region the subscriber station locates to facilitate the subsequent transmission of data with the base station. Meanwhile, a normalization procedure is applied to the ICFO detector and the primary synchronization signal detector to effectively improve the accuracy of the detection and the robustness against channel fading.

The aforementioned aspects and other aspects of the present invention will be better understood with reference to the following exemplary embodiments and drawings.

DETAILED DESCRIPTION OF THE PREFERRED EMBODIMENTS

Figure 1:
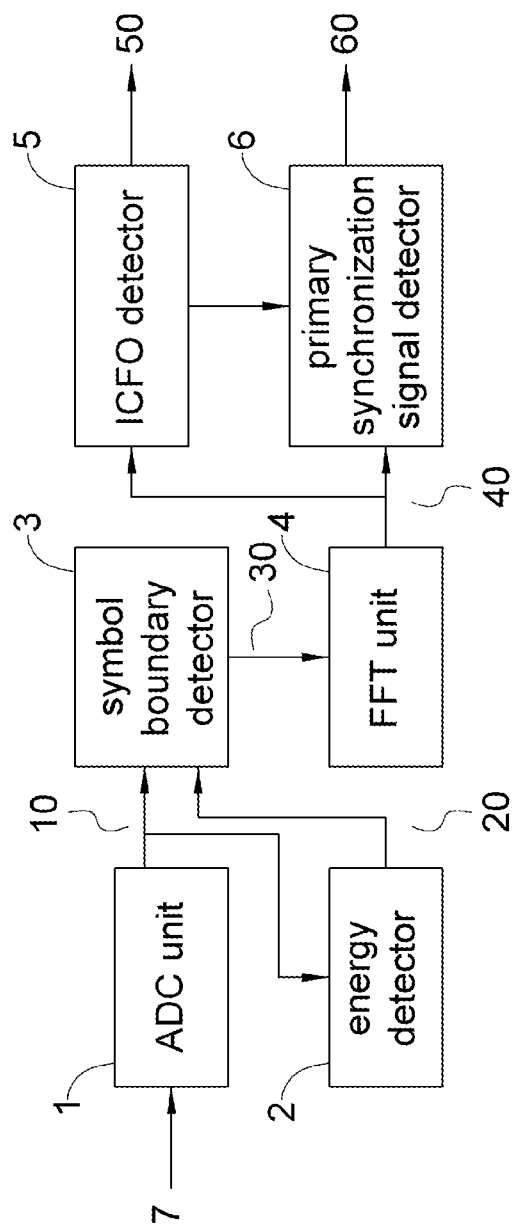
FIG. 1 is a block diagram showing the system framework of a method and an apparatus for cell search and synchronization designed for the Long Term Evolution (LTE) system in accordance with the present invention.

The present invention now will be described more fully hereinafter with reference to the accompanying drawings, in which preferred embodiments of the invention are shown. Numerals mentioned in the following description refer to those shown in the drawings. It should be noted that the words "comprising" or "including" used in the description shall be interpreted as open-ended terms with the meaning of "including but not limited to." Moreover, those of ordinary skill in the art should understand that, there may be different designations for the same component/product; for example, a "delay device" or a "delay counter (DC)" may refer to the same component/product. Therefore, components/products that are of the same technical field and similar to those mentioned in the following description should also be included in the scope of the present application.

The present invention is a method and an apparatus for cell search and synchronization designed for the LTE system, in which the primary synchronization signal sequence transmitted by the base station is detected at the subscriber station so that the subsequent transmission of control signals and data between the base station and the subscriber station can be performed at correct clock pulses. Meanwhile, the subscriber station can use the primary synchronization signal sequence to estimate the ICFO inflicted on the received signal, thereby providing reference for the subsequent signal processing. The present invention provides a reliable and less complicated method for cell search and synchronization, which is capable of detecting various primary synchronization signal sequences used by different base stations.

FIG. 1 is a block diagram showing the system framework of a method and an apparatus for cell search and synchronization designed for the LTE system in accordance with the present invention. According to the present invention, there is a method and an apparatus for cell search and synchronization designed for the LTE system comprising:

an ADC unit 1 receiving an analog signal 7 transmitted by a base station and performing an ADC processing thereon to output a digital signal 10, wherein the sampling frequency used during the conversion depends on the frequency bandwidth used by the system;

an energy detector 2 receiving the digital signal 10 and detecting the energy of the received signals accumulated for a period of time to obtain a detection result and output a normalization reference value 20;

a symbol boundary detector 3 receiving the digital signal 10 and the normalization reference value 20 and utilizing the property of the cyclic prefix type guard interval (GI) to detect the location of the symbol boundary of the system transmission, wherein the symbol boundary detector 3 receives the normalization reference value 20 based on which correlation values are normalized to determine the location of the final GI and output a detection result 30;

a FFT unit 4 receiving the detection result 30, removing samples which belongs to the GI and transforming the digital signal from time domain to frequency domain, wherein FFT units of various lengths are selected according to different frequency bandwidths in the system specification and the FFT units specified in the system specification can have the lengths of 128, 256, 512, 1024, 1536 and 2048 and output a primary synchronization signal 40;

an ICFO detector 5 receiving the primary synchronization signal 40 and employing the central symmetry property of the primary synchronization signal 40 to obtain the estimated ICFO value and output an ICFO signal 50; and a primary synchronization signal detector 6 receiving the primary synchronization signal 40 and ICFO signal 50 and calculating the correlation between the primary synchronization signal 40 and different primary synchronization signals to determine the unique ID to which the primary synchronization signal finally received by the subscriber station corresponds and output an unique ID 60.

Figure 2:
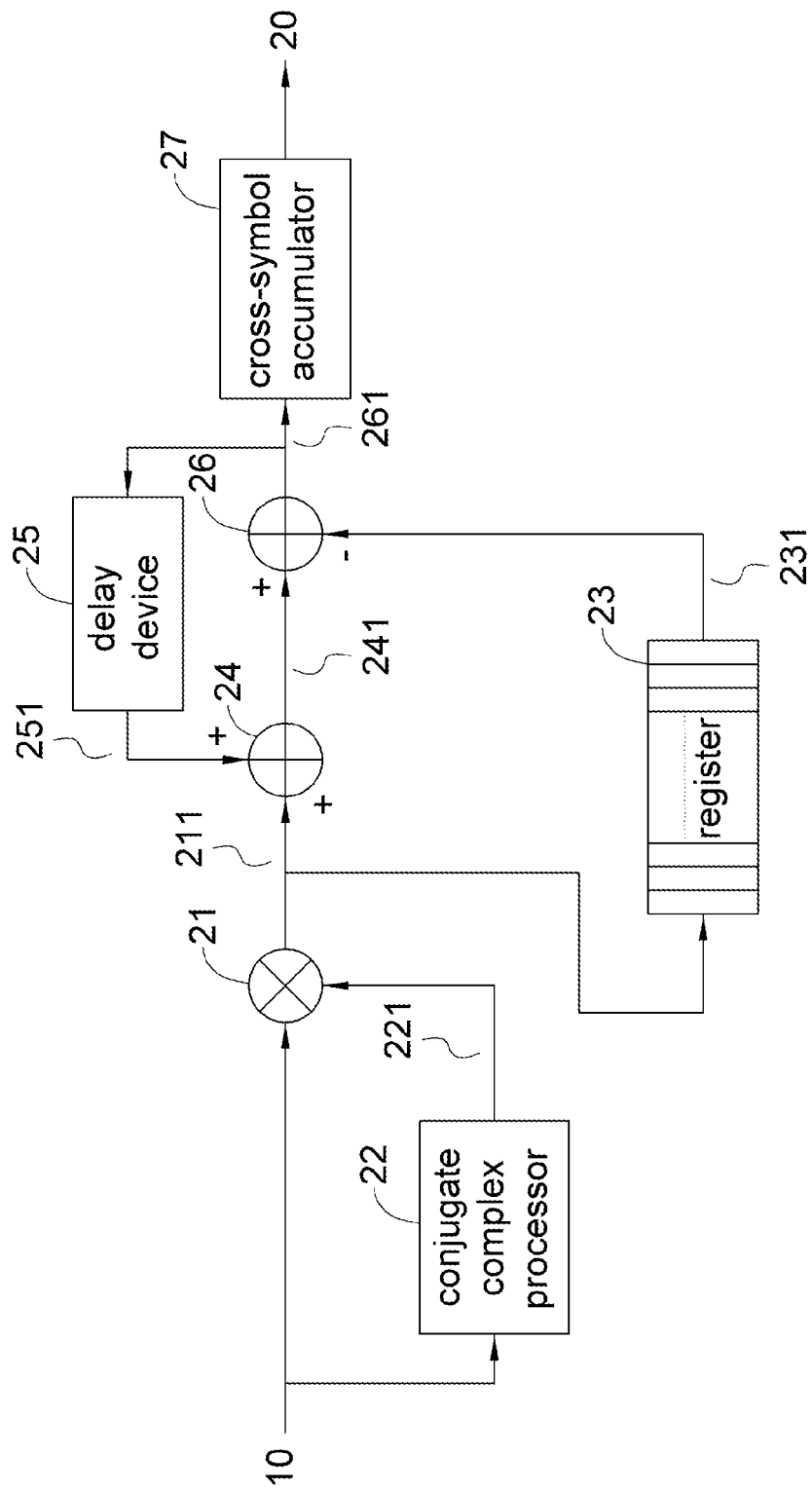
FIG. 2 is a block diagram showing an energy detector of a method and an apparatus for cell search and synchronization designed for the LTE system in accordance with the present invention.

FIG. 2 is a block diagram showing an energy detector of a method and an apparatus for cell search and synchronization designed for the LTE system in accordance with the present invention. The energy detector 2 comprises a first complex multiplier 21, a first conjugate complex processor 22, a first register 23, a first complex adder 24, a first delay device 25, a second complex adder 26 and a first cross-symbol accumulator 27. The first conjugate complex processor 22 receives the digital signal 10 and performs a conjugate complex processing thereon to output a first conjugate complex signal 221. The first complex multiplier 21 receives the digital signal 10 and the first conjugate complex signal 221 and performs a multiplication processing thereon to output a first product signal 211, as expressed in equation (1):

$$Y_1(n)=r(n)*r*(n) \quad (1)$$

The first register 23 receives and stores the first product signal 211. The first register 23 has a length G, which is equivalent to the length of the GI, and is a First-In First-Out (FIFO) register that outputs a first temporary signal 231 at the time of (n-G) when the time is n. When the time is n, the output of the first delay device 25 is the result of the accumulation of the output of the first complex multiplier 21 by the time of previous G, as expressed in equation (2):

$$P(n-1) = \sum_{i=n-G-1}^{n-1} Y_1(i) \quad (2)$$

wherein i denotes the sampling time. P(n−1) denotes a first delay signal 251 outputted by the first delay device 25 when the time is n. The first complex adder 24 receives the first product signal 211 and the first delay signal 251 and performs an adding processing thereon to output a first summation signal 241, as expressed in equation (3):

$$Q(n)=Y_1(n)+P(n-1) \quad (3)$$

The second complex adder 26 receives the first summation signal 241 and the first temporary signal 231 and performs a subtraction processing thereon to output a second summation signal 261, which is the result of the energy of the digital signal accumulated from n−G+1 to n when the time is n, as expressed in equation (4):

$$P(n)=Q(n)-r(n-G)*r*(n-G) \quad (4)$$

The first cross-symbol accumulator 27 receives the second summation signal 261 and performs a cross-symbol energy accumulation processing on the second summation signal 261, i.e. the result of equation (4) calculated by previous I OFDM symbols (inclusive of the current moment), to output the normalization reference value 20. The first cross-symbol accumulator 27 is configured to mitigate the impact of noise on the signal transmitted by the base station and passing the channel and to reduce the interference of the noise. The I value can be adjusted according to the environment where the user is located. If the user is in a location where the signal quality is relatively poor, the I value can be increased to reduce the interference of the noise. When the user is in a location where the signal quality is relatively good, the I value can be decreased to reduce the complexity in calculation. The I value can be set to be a minimum of 1.

Figure 3:
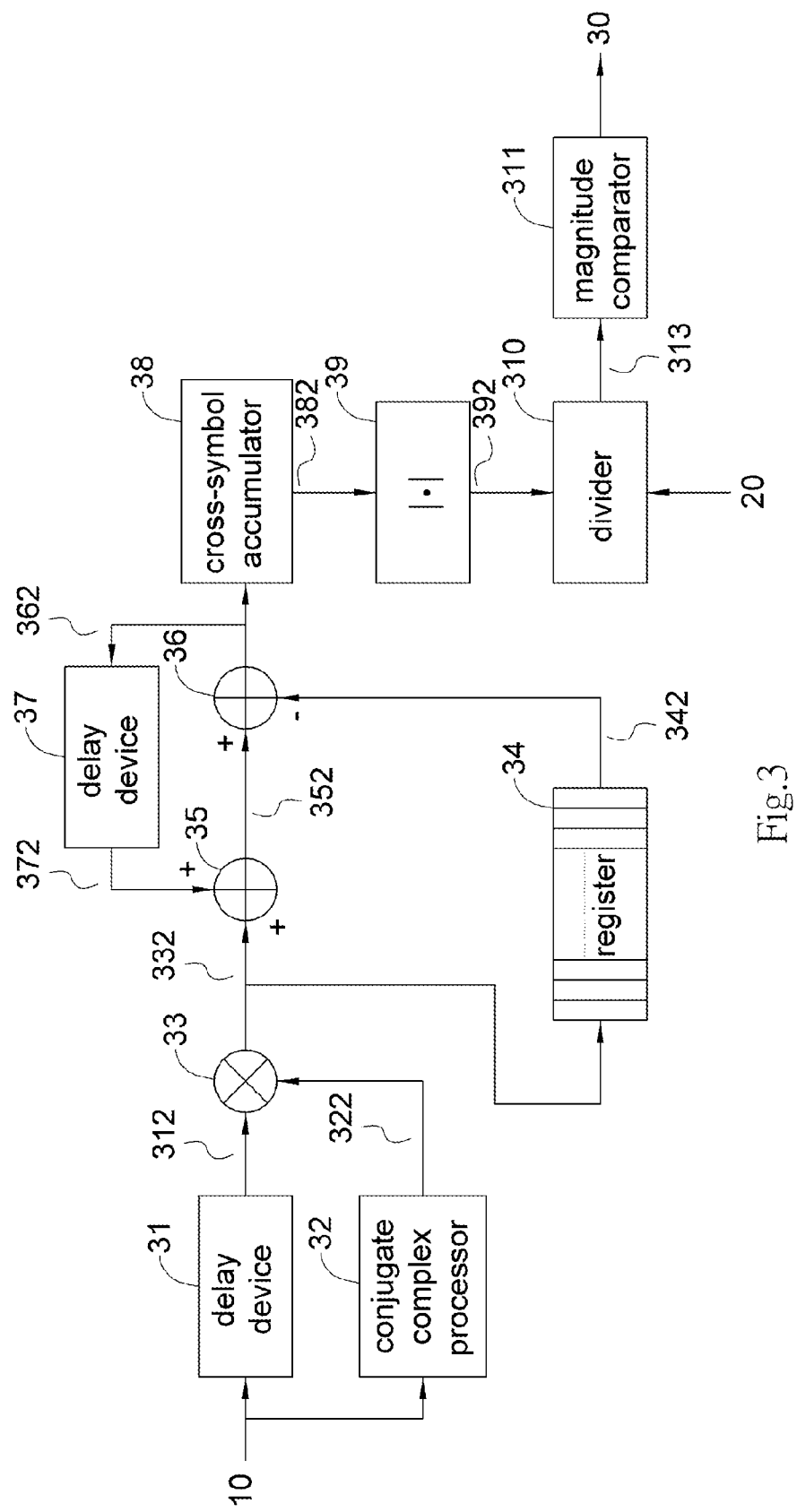
FIG. 3 is a block diagram showing a symbol boundary detector of a method and an apparatus for cell search and synchronization designed for the LTE system in accordance with the present invention.

FIG. 3 is a block diagram showing a symbol boundary detector of a method and an apparatus for cell search and synchronization designed for the LTE system in accordance with the present invention. The symbol boundary detector 3 comprises a second delay device 31, a second conjugate complex processor 32, a second complex multiplier 33, a second register 34, a third complex adder 35, a fourth complex adder 36, a third delay device 37, a second cross-symbol accumulator 38, an absolute value processor 39, a divider 310 and a magnitude comparator 311. The second conjugate complex processor 32 receives the digital signal 10 and performs the conjugate complex processing thereon to output a second conjugate complex signal 322. The second delay device 31 receives the digital signal 10 and performs the delay processing with a delay of N sampling time thereon to output a second delay signal 312, wherein N is the length of a FFT unit specified in the system specification at a specific frequency bandwidth. The second complex multiplier 33 receives the second conjugate complex signal 322 and the second delay signal 312 and performs the multiplying processing thereon to output a second product signal 332, which represents the correlation between the second conjugate complex signal 322 and the second delay signal 312. When the signal received by the second complex multiplier 33 is in the corresponding location in the Cyclic Prefix, there is a highly positive correlation between the second conjugate complex signal 322 and the second delay signal 312. When the time is n, the correlation between the two signals is expressed as equation (5):

$$X_1(n)=r(n-N)*r*(n) \quad (5)$$

wherein $X_1(n)$ is the second product signal 332 when the time is n. The second register 34 receives and stores the second product signal 332 to output a second temporary signal 342. The second register 34 has a length G, which is equivalent to the length of the GI, and is a FIFO register that outputs the calculation result of the second complex multiplier 33 at the time of (n−G) when the time is n. The third complex adder 35 receives the second product signal 332 and a third delay signal 372 and performs the adding processing thereon to output a third summation signal 352. When the time is n, the third delay device 37 outputs the third delay signal 372, which is the result of the accumulation of the output of the second complex multiplier 33 by the time of previous G, and G is the number of samples in the GI, as expressed in equation (6):

$$\Phi(n-1) = \sum_{i=n-G-1}^{n-1} X_1(i) \quad (6)$$

wherein i denotes the sampling time. Φ(n−1) is the output of the third delay device 37 with a delay of one sampling time unit when the time is n. The third complex adder 35 receives the second product signal 332 and the third delay signal 372 and performs the adding processing thereon to output the third summation signal 352, as expressed in equation (7):

$$K(n)=X_1(n)+\Phi(n-1) \tag{7}$$

wherein K(n) is the third summation signal 352. The fourth complex adder 36 receives the third summation signal 352 and the second temporary signal 342 and performs the subtraction processing thereon to output a fourth summation signal 362, which is the result of the accumulation of correlation values from time n−G+1 to n when the time is n, as expressed in equation (8):

$$\Phi(n)=K(n)-r(n-G-N)*r*(n-G) \tag{8}$$

wherein φ(n) is the fourth summation signal 362 calculated by previous I OFDM symbols (inclusive of the current moment). The second cross-symbol accumulator 38 receives the fourth summation signal 362 and performs the accumulation processing on correlation values across symbols for the fourth summation signal 362 to output a cross-symbol accumulation signal 382. The absolute value processor 39 receives the cross-symbol accumulation signal 382 and performs the absolute value processing thereon to output an absolute value signal 392. The divider 310 receives the absolute value signal 392 and the normalization reference value 20 and performs the dividing processing thereon to output a first normalization signal 313. In the symbol boundary detector 3, the symbol energy is normalized because the energy of each sample is different and the determination made directly on the accumulated correlation values will be influenced by the magnitude of samples easily. The first normalization signal 313 is expressed as equation (9):

$$\Gamma(n) = \frac{\Phi(n)}{P(n)} \tag{9}$$

The magnitude comparator 311 receives the first normalization signal 313, searches the maximum value of the first normalization signal 313 among the N+G samples and outputs the detection result 30. N is the length of the FFT unit specified in the system specification at a specific frequency bandwidth, and G is the number of samples in the GI. The number of samples for an OFDM symbol is the length of the FFT unit specified in the system specification at a specific frequency bandwidth added with the number of samples in the GI. In the magnitude comparator 311, the critical reference value of Γ(n) is set to be 0.05 to prevent the interference of noise which occurs when there is no data point transmission. When the magnitude comparator 311 determines that the maximum value among the N+G samples is greater than the critical reference value, the time n to which the maximum value corresponds is determined to be the location to which the symbol boundary corresponds, and the detection result 30 is outputted to the FFT unit 4 to be processed. If the maximum value is not greater than the critical reference value, the above step is repeated to calculate the location of the sample to which the symbol boundary corresponds.

After the symbol boundary is successfully detected, the symbol to which the primary synchronization signal corresponds can be obtained, and the signal is sent to the FFT unit 4 to be transformed from time domain to frequency domain. Next, the ICFO detector 5 and the primary synchronization signal detector 6 are utilized to detect the estimated ICFO value and the unique ID to which the primary synchronization signal received by the subscriber station corresponds.

In the LTE system, the primary synchronization signal transmitted by the base station is a Zadoff-Chu sequence having a length of 62. The base station has various unique IDs for different areas where different users are located. Different unique IDs correspond to different root indices of the Zadoff-Chu sequence and thus different primary synchronization signal sequences are generated. In the LTE system specification, there are three different unique IDs, 0, 1 and 2, corresponding respectively to three different root indices, 25, 29 and 34. The primary synchronization signal sequence is expressed as equation (10):

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \tag{10}$$

As shown in equation (10), u is the root index and $d_u(n)$ is the generated primary synchronization signal sequence. The primary synchronization signal sequence has the following characteristics.

1. The absolute value of each element in the primary synchronization signal sequence is a constant 1.

2. The primary synchronization signal sequence is characterized by the central symmetry property, that is, the value of the element whose location is 0 is equivalent to the value of the element whose location is 61, and other locations can be derived in the same way.

3. The sequence with a root index of 29 and the sequence with a root index of 34 are conjugate sequences, that is, elements at the same locations in the two sequences are conjugate complex numbers with respect to each other.

Figure 4:
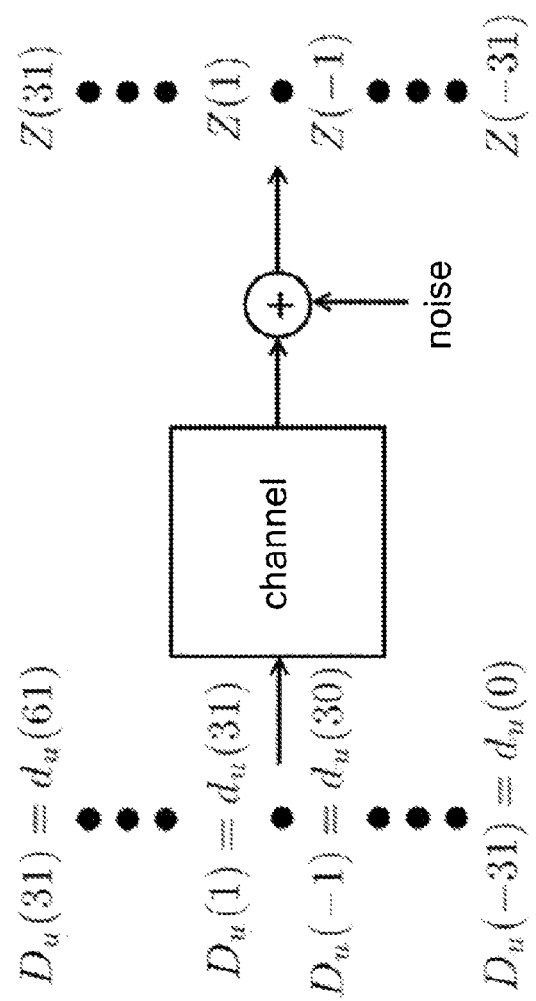
FIG. 4 is a schematic view showing the placement of the primary synchronization signal sequence on the resource units of the frequency domain of the corresponding symbol timing.

When the base station transmits the primary synchronization signal sequence, the primary synchronization signal sequence is placed on the resource element (RE) of the frequency domain of certain symbol. Referring to FIG. 4, the primary synchronization signal sequence is placed on 31 sub-carriers at each of the left side and the right side of the sub-carrier of the central frequency, wherein the sub-carriers of the central frequency carry no data. $D_u(n)$ denotes the last transmitted primary synchronization signal sequence. The primary synchronization signal sequence received by the receiving end will be affected by the channel and noise, and the finally received primary synchronization signal sequence is Z(n).

As the oscillation frequency used in the base station may be inconsistent with that of the subscriber station, such inconsistency will damage the orthogonality between the sub-carriers of the signal received by the subscriber station and cause Inter-Carrier Interference (ICI), thus the location of the sub-carrier in the frequency domain where the data received by the subscriber station is located may be offset to the location of another sub-carrier. The frequency band used in the LTE system is 2 GHz, the tolerance range within which the oscillator used by the base station does not match that of the subscriber station is ±20 ppm, and the system sub-carrier spacing is 15 kHz. Therefore, the maximum offset range of the sub-carrier frequency is the spacing of ±3 sub-carriers. Regarding the signal processing performed at the subscriber station, the sub-carrier frequency offset needs to be estimated first so as to obtain the required data at the correct RE location in the frequency domain. For the above-mentioned reason, it requires the detection of the ICFO to obtain the correct location of the primary synchronization signal sequence after the FFT unit 4 is utilized to transform the primary synchronization signal from time domain to frequency domain. Therefore, the result outputted from the FFT unit 4 is sent to the ICFO detector 5.

Figure 5:
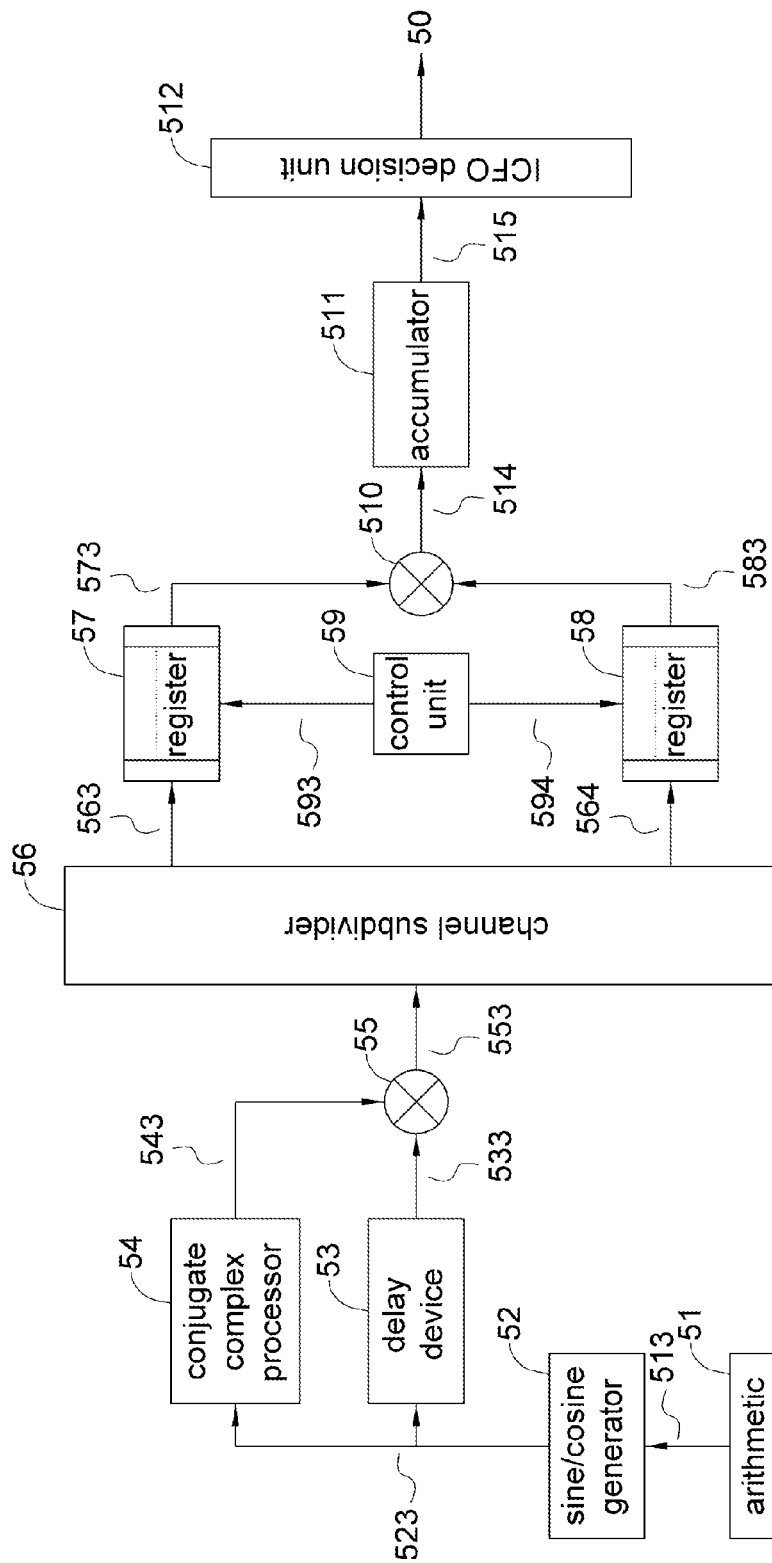
FIG. 5 is a block diagram showing an ICFO detector of a method and an apparatus for cell search and synchronization designed for the LTE system in accordance with the present invention.

FIG. 5 is a block diagram showing an ICFO detector of a method and an apparatus for cell search and synchronization designed for the LTE system in accordance with the present invention. The ICFO detector 5 comprises a first coordinate arithmetic unit 51, a first sine/cosine generator 52, a fourth delay device 53, a third conjugate complex processor 54, a third complex multiplier 55, a channel subdivider 56, a third register 57, a fourth register 58, a first control unit 59, a fourth complex multiplier 510, a first accumulator 511 and an ICFO decision unit 512. As the range of the ICFO is the spacing of ±3 sub-carriers, the data which are sequentially inputted to the overall 69 REs at both sides of the central frequency are Z(−34)~Z(34). The first coordinate arithmetic unit 51 receives the primary synchronization signal 40 and performs an angle calculation thereon to output a first digital signal angle 513. The first sine/cosine generator 52 receives the first digital signal angle 513 and performs a normalization processing thereon to output a second normalization signal 523, as expressed in equation (11):

$$Z_n(i) = \frac{Z(i)}{\|Z(i)\|} \quad (11)$$

The third conjugate complex processor 54 receives the second normalization signal 523 and performs the conjugate complex processing thereon to output a third conjugate complex signal 543. The fourth delay device 53 receives the second normalization signal 523 and performs the delay processing thereon with a delay of one sampling time to output a fourth delay signal 533. The third complex multiplier receives the fourth delay signal 533 and the third conjugate complex signal 543 and performs the multiplying processing thereon to output a third product signal 553, as expressed in equation (12):

$$J(i)=Z_{n*}(i)*Z_n(i-1) \quad (12)$$

wherein J(i) is the third product signal 553 after the input of the $i^{th}$ RE. In order to eliminate the channel effect imposed on the primary synchronization signal sequence after it passes the channel, the conjugate complex number of the data on the $i^{th}$ RE is multiplied by the data on the adjacent RE. The channel subdivider 56 receives the third product signal 553 and performs a distribution processing thereon to output a first distribution signal 563 and a second distribution signal 564.

As the block diagram of the ICFO detector shows that the data on 69 REs are inputted, there will be 68 sets of third product signals 553 in total. $1^{st}$ through $36^{th}$ entries of data of the third product signal 553 are sequentially stored in the third register 57 via the channel subdivider 56 while $33^{rd}$ through $68^{th}$ entries of data of the third product signal 553 are sequentially stored in the fourth register 58. The third register 57 and the fourth register 58 both have a length of 36. The data stored in the third register 57 is expressed as equation (13):

$$S_1(i+34)=J(i), i=-33~2 \quad (13)$$

wherein $S_1$ denotes the data sequence stored in the third register 57. The data stored in the fourth register 58 is expressed as equation (14):

$$S_2(i+34)=J(i), i=-1~34 \quad (14)$$

wherein $S_2$ denotes the data sequence stored in the fourth register 58. As the primary synchronization signal sequence is characterized by the central symmetry property, the estimation of different ICFOs is performed by using the symmetry to calculate and accumulate their correlation. The first control unit 59 outputs a first control signal 593 and a second control signal 594 according to the correlation of different ICFOs to be estimated at the moment. The third register 57 and the fourth register 58 respectively receive the first control signal 593 and the second control signal 594 and output the corresponding data locations, a third temporary signal 573 and a fourth temporary signal 583, respectively. Suppose the correlation of the first set of symmetric data under the condition that the ICFO is 0 is to be calculated, the first control unit 59 will retrieve the fourth entry of data from the third register 57 and the fourth entry of data from the fourth register 58 and output the two sets of data as the third temporary signal 573 and the fourth temporary signal 583, respectively. The fourth complex multiplier 510 receives the third temporary signal 573 and the fourth temporary signal 583 and performs the multiplying processing thereon to output a fourth product signal 514, as expressed in equation (15):

$$M_1(1)=S_1(4)*S_2(4) \quad (15)$$

wherein $M_1(1)$ is the fourth product signal 514. Next, the first control unit 59 retrieves the data about the corresponding locations of the second set of symmetric data in the third register 57 and the fourth register 58, and outputs such data as the third temporary signal 573 and the fourth temporary signal 583, respectively. The fourth complex multiplier 510 receives the third temporary signal 573 and the fourth temporary signal 583 and performs the multiplying processing thereon to output a fourth product signal 514. The first control unit 59 will repeat the above step to retrieve 30 sets of symmetric data. The first accumulator 511 receives the fourth product signal 514 and performs the accumulation processing on the 30 sets of fourth product signals 514 to output a first accumulation signal 515. The ICFO decision unit 512 receives the first accumulation signal 515, and there are seven possible ICFOs because the range of the ICFO is the spacing of ±3 sub-carriers. The first control unit 59 will retrieve the symmetric data to which the seven ICFOs correspond, and there are 30 sets of symmetric data for each ICFO. The first accumulator 511 will respectively accumulate the result of the correlation values of the seven ICFOs. The first accumulator 511 has seven outputs in total. The outputs of the first accumulator 511 correspond to different estimated ICFO values and are calculated as the first accumulation signal 515, as expressed in equation (16):

$$\Omega(v) = \sum_{i=-30}^{-1} S_1(i+v)*S_2(-i+1+v) \quad (16)$$

wherein v denotes different estimated ICFO values and has a range of ±3. $\Omega(v)$ denotes the first accumulation signal 515 to which different estimated ICFO values correspond. The seven outputs of the first accumulator 511 are sent to the ICFO decision unit 512. The ICFO decision unit 512 receives the first accumulation signal 515 and outputs the ICFO signal 50, which is used to calculate the distances between the seven complex values of the first accumulator 511 and the point (30+0i), and the ICFO value to which the minimum distance corresponds serves as the final estimated value for the ICFO in the system. The calculation is made with equation (17):

$$(\hat{v})=\arg \min|(v)-(30+0i)| \tag{17}$$

wherein $\hat{v}$ is the ICFO signal 50, i.e. the result of the ICFO that affects the system as finally estimated by the ICFO detector 5.

When the ICFO detector 5 is utilized to obtain the ICFO value, the location of the primary synchronization signal sequence data in the RE of the frequency domain can be obtained. The primary synchronization signal data outputted by the FFT unit 4 is sent to the primary synchronization signal detector 6 to determine the unique ID issued by the base station for the area where the user is located, and the best matching result will be selected.

Figure 6:
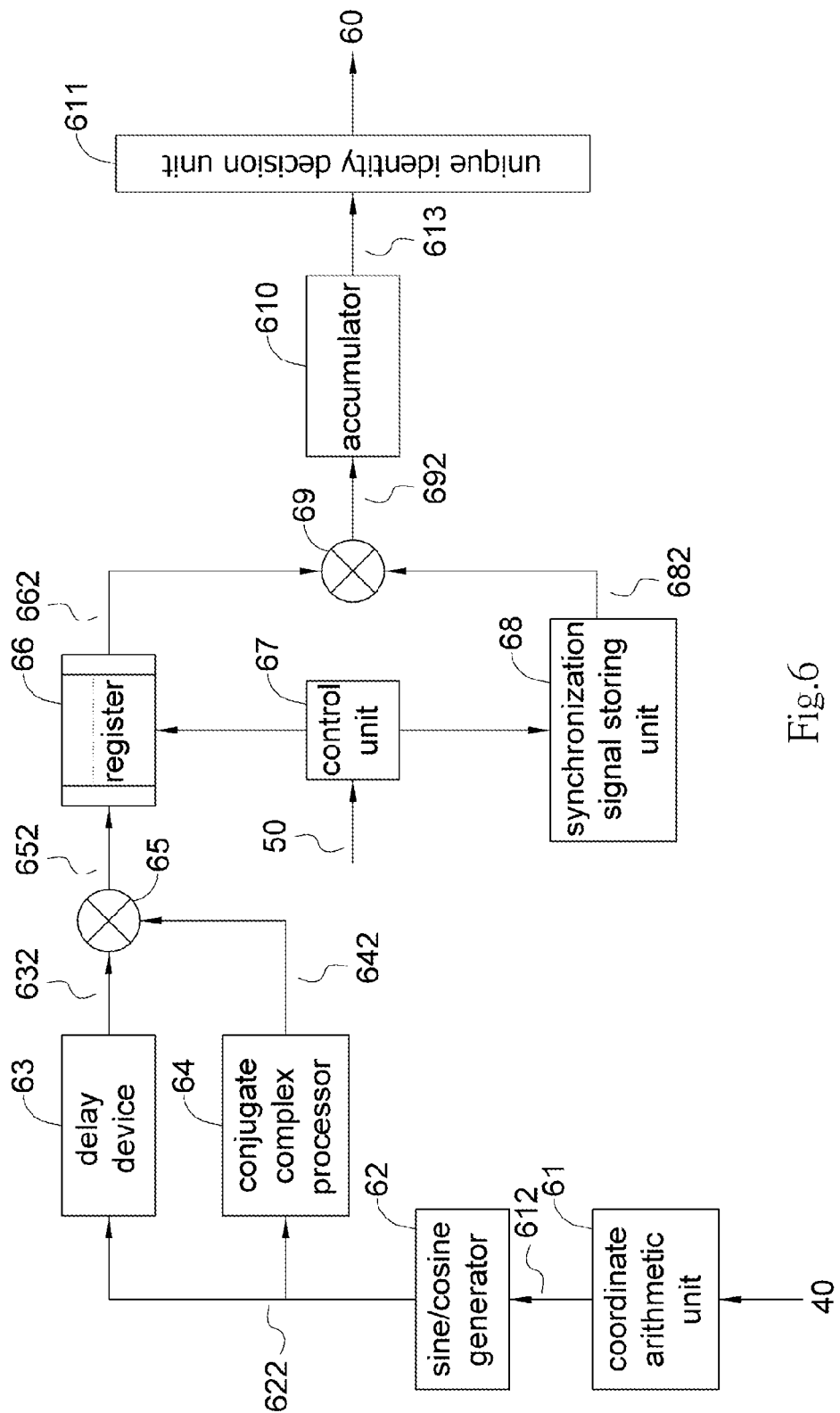
FIG. 6 is a block diagram showing a primary synchronization signal detector of a method and an apparatus for cell search and synchronization designed for the LTE system in accordance with the present invention.

FIG. 6 is a block diagram showing a primary synchronization signal detector of a method and an apparatus for cell search and synchronization designed for the LTE system in accordance with the present invention. The primary synchronization signal detector 6 comprises a second coordinate arithmetic unit 61, a second sine/cosine generator 62, a fifth delay device 63, a fourth conjugate complex processor 64, a fifth complex multiplier 65, a fifth register 66, a second control unit 67, a primary synchronization signal storing unit 68, a sixth complex multiplier 69, a second accumulator 610 and an unique ID decision unit 611. As the range of the ICFO is the spacing of ±3 sub-carriers, the data which are sequentially inputted to the overall 69 REs at both sides of the central frequency are Z(−34)~Z(34), as shown in the block diagram of the primary synchronization signal detector. The second coordinate arithmetic unit 61 receives the primary synchronization signal 40 and performs the angle calculation thereon to output a second digital signal angle 612. The second sine/cosine generator 62 receives the second digital signal angle 612 and performs the normalization processing thereon to output a third normalization signal 622. The value of the third normalization signal 622 is expressed as equation (18):

$$Z_n(i) = \frac{Z(i)}{\|Z(i)\|} \tag{18}$$

The fourth conjugate complex processor 64 receives the third normalization signal 622 and performs the conjugate complex processing thereon to output a fourth conjugate complex signal 642. The fifth delay device 63 receives the third normalization signal 622 and performs the delay processing thereon with a delay of one sampling time to output a fifth delay signal 632. The fifth complex multiplier 65 receives the fifth delay signal 632 and the fourth conjugate complex signal 642 and performs the multiplying processing thereon to output a fifth product signal 652, as expressed in equation (19):

$$H(i)=Z_{n*}(i)*Z_n(i-1) \tag{19}$$

wherein H(i) is the fifth product signal 652 outputted after the input of the $i^{th}$ RE. In order to eliminate the channel effect imposed on the primary synchronization signal sequence after it passes the channel, the conjugate complex number of the data on the $i^{th}$ RE is multiplied by the data on the adjacent RE. Referring to FIGS. 5 and 6, the functions of the first coordinate arithmetic unit 51, the first sine/cosine generator 52, the fourth delay device 53, the third conjugate complex processor 54 and the third complex multiplier 55 are the same as those of the second coordinate arithmetic unit 61, the second sine/cosine generator 62, the fifth delay device 63, the fourth conjugate complex processor 64, and the fifth complex multiplier 65, thus the hardware resource of this part is shared in one embodiment. The fifth register 66 sequentially receives the fifth product signal 652 and performs the storing processing thereon sequentially. The data stored in the fifth register 66 is expressed as equation (20):

$$S_3(i+34)=H(i), i=-33\sim34 \tag{20}$$

wherein $S_3$ denotes the data sequence stored in the fifth register 66. The fifth register 66 has a length of 68. In the block diagram of the primary synchronization signal detector, the primary synchronization signal detector 6 receives the output of the ICFO detector 5.

Under the circumstance that the ICFO is known, a third control signal 672 and a fourth control signal 673 outputted by the second control unit 67 are respectively sent to the fifth register 66 and the primary synchronization signal storing unit 68, the correct data location corresponding to the received data affected by the ICFO is retrieved from the fifth register 66 via the third control signal 672 outputted by the second control unit 67. For example, when the ICFO is 0, the correct location of the primary synchronization signal 40 stored in the fifth register 66 after being processed is $S_3(4)\sim S_3(65)$ The primary synchronization signal storing unit 68 stores the possible results obtained by performing the conjugate complex multiplication on the elements and the adjacent elements in all potential primary synchronization signal sequences transmitted by the base station.

As the primary synchronization signal sequence is characterized by the central symmetry property and two sequences with a root index of 29 and a root index of 34 are conjugate sequences, the primary synchronization signal storing unit 68 causes the storing of the result obtained by performing the conjugate complex multiplication on the elements at the left side of each of the two sequences with a root index of 25 and a root index of 29 and the adjacent elements. The unique ID transmitted by the base station can be estimated by calculating and accumulating the correlation between the primary synchronization signals with three different known root indices and the received primary synchronization signal. Next, the best matching result will be selected to be the detected unique ID. As there are three different unique IDs corresponding to three root indices, the fifth register 66 and the primary synchronization signal storing unit 68 respectively receive the third control signal 672 and the fourth control signal 673 and respectively output a fifth temporary signal 662 and a primary synchronization signal storage signal 682 when the correlation value is calculated at the root index of 25. The sixth complex multiplier 69 receives the fifth temporary signal 662 and the primary synchronization signal storage signal 682 at the first corresponding data. Suppose the detection result of the ICFO is 0, a sixth product signal 692 is outputted, as expressed in equation (21):

$$M_2(1)=S_i(4)*D_{25*(-31)}*D_{25}(-30) \tag{21}$$

Wherein $M_2(1)$ is the sixth product signal 692. The second control unit 67 retrieves the data to which the second symmetric data correspond in the fifth register 66 and the primary synchronization signal storing unit 68 and outputs such data to the sixth complex multiplier 69. The second control unit 67 repeats this step to retrieve 60 sets of symmetric data. The second accumulator 610 receives the sixth product signal 692 and performs the accumulation processing thereon (i.e. the correlation value obtained after the sixth complex multiplier 69 calculates the accumulated data of the 60 sets of symmetric data) to output a second accumulation signal 613. The unique ID decision unit 611 receives the second accumulation signal 613 under the circumstance that there are three different root indices and seven different ICFO results detected by the ICFO detector 5. The calculation of the second accumulation signal 613 corresponding to different root indices is made with equation (22):

$$\Lambda(u) = \sum_{k=-31}^{-2} S_3(k+v+35) * D_u^*(k) * D_u(k+1) + \sum_{k=1}^{30} S_3(k+v+35) * D_u^*(k+1) * D_u(k)$$

(22)

$\Lambda(u)$ denotes the corresponding second accumulation signal 613 at different root indices. The unique ID decision unit 611 receives three sets of second accumulation signals 613. The unique ID decision unit 611 calculates the magnitude of the three sets of second accumulation signals 613, retrieves the corresponding unique ID of the root index to which the set of second accumulation signal 613 with the greatest magnitude corresponds as the final estimated value of the unique ID for the system, and outputs the unique ID 60. The calculation is made with equation (23):

$$\hat{u} = \arg\max \Lambda(u)$$

(23)

In equation (23), $\hat{u}$ is the result of the unique ID for the system finally estimated by the primary synchronization signal detector 6. The method for cell search and synchronization designed for the LTE system ends with the primary synchronization signal detector 6 outputting the unique ID 60.

All the above-mentioned functions can be performed by a processor, such as a microprocessor, a controller, a microcontroller or an application specific integrated circuit (ASIC), in accordance with the software or program code for executing such functions. The mobile subscriber station generally employs an ASIC. In real practice, it requires three real complex multipliers and five real adders to realize the complex multiplier. It requires two real adders to realize the complex adder. Table 1 below lists the respective computation loads required for the present invention and the traditional technique and the ratio of the computation load of the present invention and that of the previous invention.

TABLE 1

|  | Real Adder | Real Complex Multiplier |
| --- | --- | --- |
| Traditional Technique | 9072 | 3906. |
| The Present Invention | 2811 | 1341. |
| Percentage | 30.9% | 34.3% |

Figure 7:
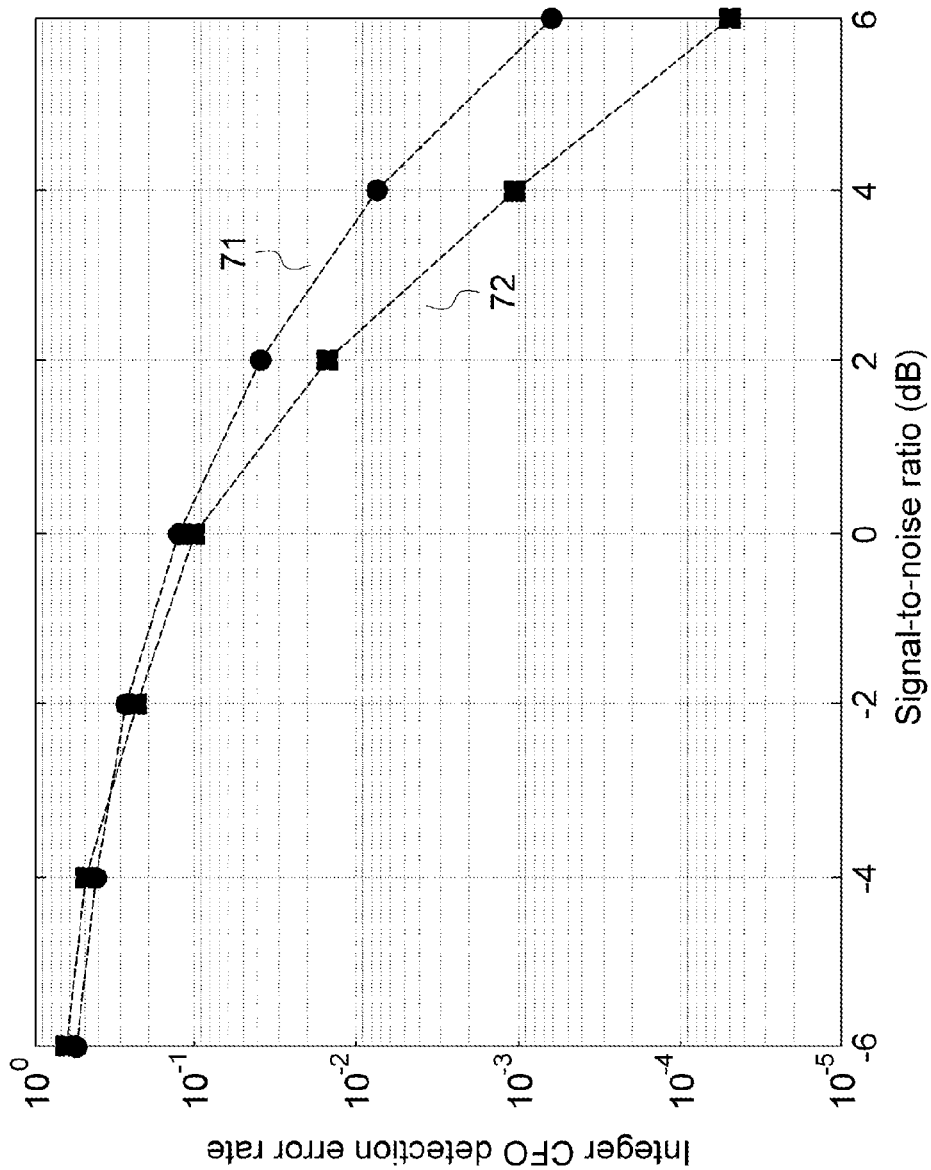
FIG. 7 is a graph showing an ICFO detection result of the simulation comparison between a method and an apparatus for cell search and synchronization designed for the LTE system in accordance with the present invention and a traditional method.

FIG. 7 is a graph showing an ICFO detection result of the simulation comparison between a method and an apparatus for cell search and synchronization designed for the LTE system in accordance with the present invention and a traditional method. FIG. 7 shows two simulation results, the simulation result 71 of the traditional method and the simulation result 72 of the present invention. The simulation is carried out for 500 thousand times, and the ICFO that affects the receiving e is randomly generated. As can be seen from FIG. 7, the ICFO detection result obtained using the present invention is better than that of the traditional method and the computation load of the present invention is reduced to 31% of that of the traditional method.

Figure 8:
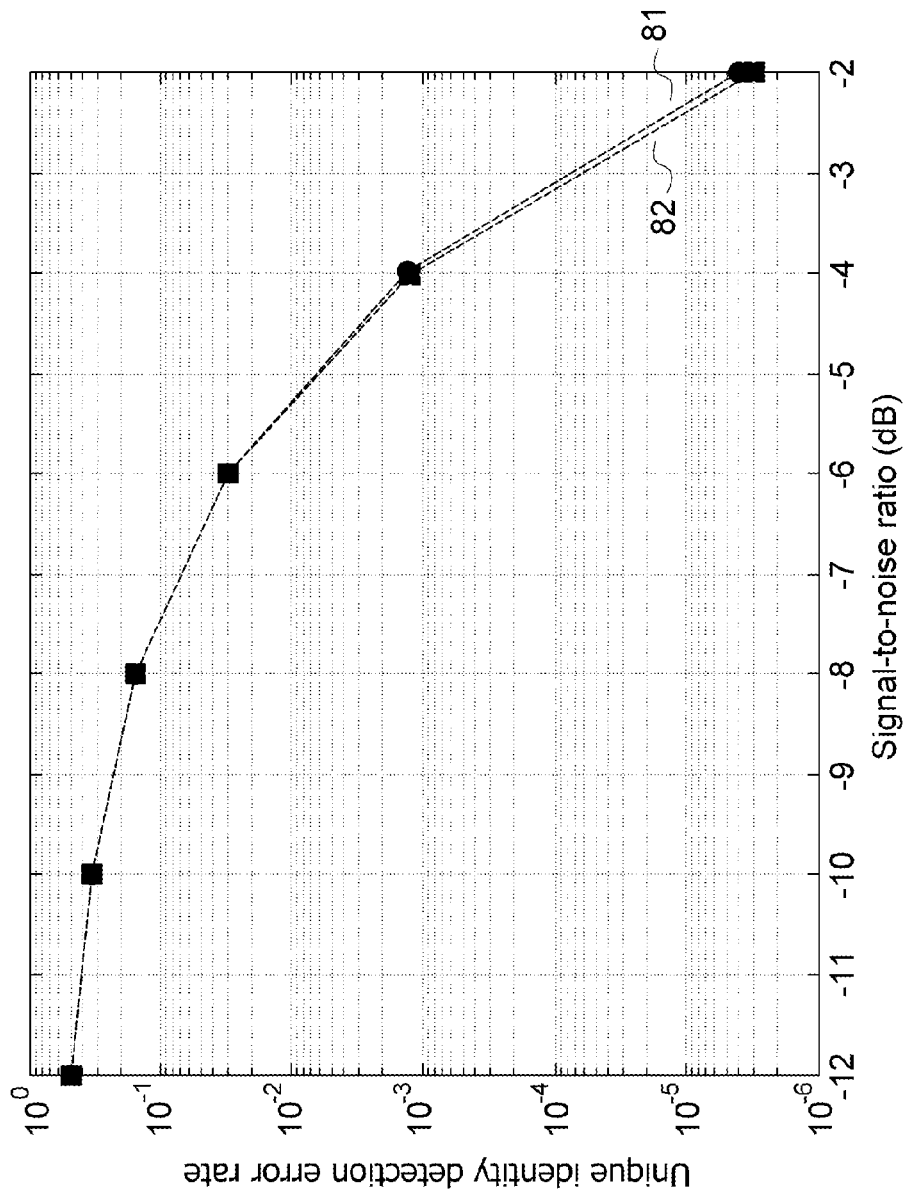
FIG. 8 is a graph showing a detection result of the unique ID to which the primary synchronization signal corresponds of the simulation comparison between a method and an apparatus for cell search and synchronization designed for the LTE system in accordance with the present invention and a traditional method.

FIG. 8 is a graph showing a detection result of the unique ID to which the primary synchronization signal corresponds of the simulation comparison between a method and an apparatus for cell search and synchronization designed for the LTE system in accordance with the present invention and a traditional method. FIG. 8 shows two simulation results, the simulation result 81 of the traditional method and the simulation result 82 of the present invention. The simulation is carried out for 500 thousand times, and the primary synchronization signal sequence transmitted by the transmitting station is randomly generated. As can be seen from FIG. 8, the detection result of the unique ID of the present invention shows better accuracy compared with that of the traditional method, and the computation load of the present invention is reduced to 31% of that of the traditional method.

To sum up, the method and apparatus for cell search and synchronization designed for the LTE system of the present invention has the following advantages compared with the prior art technique:

1. When performing cell search and synchronization, the present invention utilizes simple signal detection techniques to detect the location of the OFDM symbol first so that the complexity of the subsequent calculation can be reduced and the accuracy can be improved;

2. The present invention utilizes the energy of the digital signal as the basis for normalization in tracing the boundary of the OFDM symbol. The result of tracing the boundary of the OFDM symbol will not be easily affected by the gain of the channel through which the signal passes and the number of samples so that the location of the boundary of the OFDM symbol can be detected accurately;

3. When detecting the ICFO and the unique ID to which the primary synchronization signal corresponds, the present invention employs the central symmetry property of the primary synchronization signal first so that the extent to which the system is affected by the ICFO can be accurately and effectively detected;

4. The present invention can detect different primary synchronization signal sequences used by the base station, and can obtain the received primary synchronization signal sequence at a correct location of the RE when the ICFO value is acquired. The unique ID to which the primary synchronization signal used by the base station in the region where the subscriber station is located corresponds is obtained by comparing different primary synchronization signal sequences; and 5. Compared with the traditional method, the computation load of the method and apparatus for cell search and synchronization designed for the LTE system of the present invention is reduced by 69%. Compared with the traditional method, the present invention's efficiency in detecting the ICFO and the unique ID to which the primary synchronization signal corresponds is better or almost unaffected.

The present invention has been described with exemplary embodiments and drawings, thus those skilled in the art understand that various modifications can be made to the forms and details, and that the embodiments are not intended to limit the patent scope of the present invention. Any implementation or alteration having equivalent effect without departing from the spirit of the present invention falls within the patent scope of the present invention.

The preferred embodiments of the method and apparatus for cell search and synchronization for the LTE system of the present invention have been described with reference to the accompanying drawings. All the features disclosed in this specification may be combined with other methods. Each feature disclosed in this specification may be replaced by an alternative feature serving the same, equivalent, or similar purpose. Thus, except for those particularly distinctive features, each feature disclosed herein is only an example of a generic series of equivalent or similar features. Given the above description of preferred embodiments, those skilled in the art would understand that the present invention possesses novelty and inventive step over the prior art and is industrially applicable. Various modifications may be made by those skilled in the art without departing from the scope of the present invention.

What is claimed is:

1. An apparatus for cell search and synchronization for a subscriber station of a Long Term Evolution (LTE) system utilizing a primary synchronization signal to establish synchronization with the LTE system comprising:
    an integer carrier frequency offset (ICFO) detector of the subscriber station receiving a primary synchronization signal of a primary synchronization code in each frame of the LTE system without identifying an identification associated with the primary synchronization signal, and performing, by using at least one processor and at least one register of the ICFO detector, an ICFO calculation thereon to output an ICFO signal; and
    a primary synchronization signal detector of the subscriber station receiving the primary synchronization signal and the ICFO signal, and performing, by using at least one processor and at least one register of the primary synchronization signal detector, a correlation calculation thereon to output an unique ID to which the primary synchronization signal corresponds so that the sequential transmission of control signals and data between a base station and the subscriber station can be performed at correct clock pulses.

2. The apparatus for cell search and synchronization according to claim 1, wherein the ICFO detector comprises:
    a first coordinate arithmetic unit receiving the primary synchronization signal and performing an angle calculation thereon to output a first digital signal angle;
    a first sine/cosine generator receiving the first digital signal angle and performing a normalization processing thereon to output a second normalization signal;
    a fourth delay device receiving the second normalization signal and performing a delay processing thereon to output a fourth delay signal;
    a third conjugate complex processor receiving the second normalization signal and performing a conjugate complex processing thereon to output a third conjugate complex signal;
    a third complex multiplier receiving the fourth delay signal and the third conjugate complex signal and performing a multiplying processing thereon to output a third product signal;
    a channel subdivider receiving the third product signal and performing a distribution processing thereon to output a first distribution signal and a second distribution signal;
    a first control unit performing a control processing on a third register and a fourth register to respectively output a first control signal and a second control signal;
    the third register receiving the first distribution signal and the first control signal and performing storing and outputting processing on the first distribution signal to output a third temporary signal;
    the fourth register receiving the second distribution signal and the second control signal and performing the storing and outputting processing on the second distribution signal to output a fourth temporary signal;
    a fourth complex multiplier receiving the third temporary signal and the fourth temporary signal and performing the multiplying processing thereon to output a fourth product signal;
    a first accumulator receiving the fourth product signal and performing an accumulation processing thereon to output a first accumulation signal; and
    an ICFO decision unit receiving the first accumulation signal and performing the ICFO calculation thereon to output the ICFO signal.

3. The ICFO detector according to claim 2, wherein the first accumulation signal is defined by the following formula:

$$\Omega(v) = \sum_{i=-30}^{-1} S_1(i+v) * S_2(-i+1+v).$$

where $v$ denotes values associated with different estimated ICFO, $S_1$ denotes data sequence stored in the third register, $S_2$ denotes data sequence stored in the fourth register, and $\Omega(v)$ denotes the first accumulation signal.

4. The ICFO detector according to claim 2, wherein the ICFO signal is defined by the following formula:

$(\hat{v}) = \arg\min |\Omega(v) - (30 + 0i)|$ where $\hat{v}$ is the ICFO signal and $\Omega(v)$ denotes the first accumulation signal.

5. The apparatus for cell search and synchronization according to claim 1, wherein the primary synchronization signal detector comprises:
    a second coordinate arithmetic unit receiving the primary synchronization signal and performing the angle calculation thereon to output a second digital signal angle;
    a second sine/cosine generator receiving the second digital signal angle and performing the normalization processing thereon to output a third normalization signal;
    a fifth delay device receiving the third normalization signal and performing the delay processing thereon to output a fifth delay signal;
    a fourth conjugate complex processor receiving the third normalization signal and performing the conjugate complex processing thereon to output a fourth conjugate complex signal;
    a fifth complex multiplier receiving the fifth delay signal and the fourth conjugate complex signal and performing the multiplying processing thereon to output a fifth product signal;
    a second control unit receiving the ICFO signal and performing the control processing on a fifth register and a primary synchronization signal storing unit to respectively output a third control signal and a fourth control signal;
    the fifth register receiving the fifth product signal and the third control signal and performing the storing and outputting processing on the fifth product signal to output a fifth temporary signal;

the primary synchronization signal storing unit receiving the primary synchronization signal and the fourth control signal and performing the storing and outputting processing on the primary synchronization signal to output a primary synchronization signal storage signal;

a sixth complex multiplier receiving the fifth temporary signal and the primary synchronization signal storage signal and performing the multiplying processing thereon to output a sixth product signal;

a second accumulator receiving the sixth product signal and performing the accumulation processing thereon to output a second accumulation signal; and an unique ID decision unit receiving the second accumulation signal and performing an unique ID estimation processing thereon to output the unique identification signal.

6. The primary synchronization signal detector according to claim 5, wherein the second accumulation signal is defined by the following formula:

$$\Lambda(u) = \sum_{k=-31}^{-2} S_3(k+v+35)*D_u^*(k)*D_u(k+1) + \sum_{k=1}^{30} S_3(k+v+35)*D_u^*(k+1)*D_u(k),$$

where v denotes values associated with different estimated ICFO, $S_3$ denotes data sequence stored in the fifth register, $D_u(k)$ denotes the last transmitted primary synchronization signal sequence and $\Lambda(u)$ denotes the corresponding second accumulation signal; and wherein the unique identification signal is defined by the following formula:

$\hat{u}$=arg max $\Lambda(u)$, where $\hat{u}$ is the result of the unique identification.

7. A method for cell search and synchronization for a subscriber station of a LTE system, characterized in that: a primary synchronization signal is used to establish synchronization with the LTE system to obtain correct clock pulses of the LTE system and an unique ID transmitted by a base station, comprising the steps of:

receiving a primary synchronization signal of a primary synchronization code in each frame of the LTE system via an ICFO detector of the subscriber station without identifying an identification associated with the primary synchronization signal, and performing, by using at least one processor and at least one register of the ICFO detector, an ICFO calculation thereon to output an ICFO signal; and receiving the primary synchronization signal and the ICFO signal, via a primary synchronization signal detector of the subscriber station, and performing, by using at least one processor and at least one register of the primary synchronization signal detector, a correlation calculation thereon to output the unique ID to which the primary synchronization signal corresponds.

8. The method for cell search and synchronization according to claim 7, wherein a method for detecting the ICFO using the ICFO detector comprises the steps of:

receiving the primary synchronization signal via a first coordinate arithmetic unit and performing an angle calculation thereon to output a first digital signal angle;

receiving the first digital signal angle via a first sine/cosine generator and performing a normalization processing thereon to output a second normalization signal;

receiving the second normalization signal via a fourth delay device and performing a delay processing thereon to output a fourth delay signal;

receiving the second normalization signal via a third conjugate complex processor and performing a conjugate complex processing thereon to output a third conjugate complex signal;

receiving the fourth delay signal and the third conjugate complex signal via a third complex multiplier and performing a multiplying processing thereon to output a third product signal;

receiving the third product signal via a channel subdivider and performing a distribution processing thereon to output a first distribution signal and a second distribution signal;

performing a control processing on a third register and a fourth register via a first control unit to respectively output a first control signal and a second control signal;

receiving the first distribution signal and the first control signal via the third register and performing storing and outputting processing on the first distribution signal to output a third temporary signal;

receiving the second distribution signal and the second control signal via the fourth register and performing the storing and outputting processing on the second distribution signal to output a fourth temporary signal;

receiving the third temporary signal and the fourth temporary signal via a fourth complex multiplier and performing the multiplying processing thereon to output a fourth product signal;

receiving the fourth product signal via a first accumulator and performing an accumulation processing thereon to output a first accumulation signal; and receiving the first accumulation signal via an ICFO decision unit and performing the ICFO calculation thereon to output the ICFO signal.

9. The method for detecting the ICFO according to claim 8, wherein the first accumulation signal is defined by the following formula:

$$\Omega(v) = \sum_{i=-30}^{-1} S_1(i+v)*S_2(-i+1+v),$$

where v denotes values associated with different estimated ICFO, $S_1$ denotes data sequence stored in the third register, $S_2$ denotes data sequence stored in the fourth register, and $\Omega(v)$ denotes the first accumulation signal.

10. The method for detecting the ICFO according to claim 8, wherein the ICFO signal is defined by the following formula:

$(\hat{v})$=arg min$|\Omega(v)-(30+0i)|$, where $\hat{v}$ is the ICFO signal and $\Omega(v)$ denotes the first accumulation signal.

11. The method for cell search and synchronization according to claim 7, wherein a method for unique ID estimation using the primary synchronization signal detector comprises the steps of:

receiving the primary synchronization signal via a second coordinate arithmetic unit and performing the angle calculation thereon to output a second digital signal angle;

receiving the second digital signal angle via a second sine/cosine generator and performing the normalization processing thereon to output a third normalization signal;

receiving the third normalization signal via a fifth delay device and performing the delay processing thereon to output a fifth delay signal;

receiving the third normalization signal via a fourth conjugate complex processor and performing the conjugate complex processing thereon to output a fourth conjugate complex signal;

receiving the fifth delay signal and the fourth conjugate complex signal via a fifth complex multiplier and performing the multiplying processing thereon to output a fifth product signal;

receiving the ICFO signal via a second control unit and performing the control processing on a fifth register and a primary synchronization signal storing unit to respectively output a third control signal and a fourth control signal;

receiving the fifth product signal and the third control signal via the fifth register and performing the storing and outputting processing on the fifth product signal to output a fifth temporary signal;

receiving the primary synchronization signal and the fourth control signal via the primary synchronization signal storing unit and performing the storing and outputting processing on the primary synchronization signal to output a primary synchronization signal storage signal;

receiving the fifth temporary signal and the primary synchronization signal storage signal via a sixth complex multiplier and performing the multiplying processing thereon to output a sixth product signal;

receiving the sixth product signal via a second accumulator and performing the accumulation processing thereon to output a second accumulation signal; and receiving the second accumulation signal via an unique ID decision unit and performing an unique ID estimation processing thereon to output the unique ID signal.

12. The method for unique ID estimation according to claim 11, wherein the second accumulation signal is defined by the following formula:

$$\Lambda(u) = \sum_{k=-31}^{-2} S_3(k+v+35) * D_u^*(k) * D_u(k+1) + \sum_{k=1}^{30} S_3(k+v+35) * D_u^*(k+1) * D_u(k),$$

where v denotes values associated with different estimated ICFO, $S_3$ denotes data sequence stored in the fifth register, $D_u(k)$ denotes the last transmitted primary synchronization signal sequence and $\Lambda(u)$ denotes the corresponding second accumulation signal; and wherein the unique ID is given by:

$\hat{u} = \arg\max \Lambda(u),$ where $\hat{u}$ is the result of the unique identification.

* * * * *